United States Patent [19]
Mitra et al.

[11] Patent Number: 5,212,015
[45] Date of Patent: May 18, 1993

[54] COATED SUBSTRATES COMPRISING POLYMERS DERIVED FROM MONOCARBAMATE DIOLS

[75] Inventors: Smarajit Mitra, West St. Paul; Cecil V. Francis, Woodbury, both of Minn.

[73] Assignee: Minnesota Mining and Manufacturing Company, St. Paul, Minn.

[21] Appl. No.: 905,267

[22] Filed: Jun. 26, 1992

Related U.S. Application Data

[62] Division of Ser. No. 760,862, Sep. 16, 1991, Pat. No. 5,163,060, which is a division of Ser. No. 365,965, Jun. 14, 1989, Pat. No. 5,093,456.

[51] Int. Cl.$^5$ .............. C08G 18/64; C08G 63/40; C08G 64/12; C08G 64/02

[52] U.S. Cl. .............. 428/412; 528/367; 528/370; 528/372; 430/56

[58] Field of Search ........... 428/412, 424.2, 425.6; 430/56; 528/73, 74, 76, 78, 79, 85, 272, 288, 290, 291, 293, 294, 295, 298, 300, 301, 307, 308, 308.6, 330, 331, 363, 364, 365, 367, 370, 372

[56] References Cited

U.S. PATENT DOCUMENTS

| | | | |
|---|---|---|---|
| 2,627,524 | 2/1953 | Malkemus | 560/166 |
| 2,928,812 | 3/1960 | Ernst | 528/262 |
| 3,205,284 | 9/1965 | McCulloch | 528/288 |
| 3,248,737 | 4/1966 | Barringer | 360/102 |
| 3,368,985 | 2/1968 | Wismer et al. | 528/78 |
| 3,595,814 | 7/1971 | Lloyd et al. | 521/167 |
| 3,703,538 | 11/1972 | Malkemus et al. | 560/166 |
| 3,741,794 | 6/1973 | Sayigh et al. | 117/93.31 |
| 3,950,285 | 4/1976 | Wolgemuth | 528/288 |
| 4,107,151 | 8/1978 | Takahashi et al. | 528/54 |
| 4,126,747 | 11/1978 | Cowherd, III et al. | 560/166 |
| 4,161,596 | 7/1979 | Cowherd, III et al. | 544/388 |
| 4,177,342 | 12/1979 | Bock et al. | 528/48 |
| 4,248,994 | 2/1981 | Cook | 528/60 |
| 4,500,717 | 2/1985 | Cook et al. | 548/229 |
| 4,605,869 | 8/1986 | Choe | 372/21 |
| 4,691,059 | 9/1987 | Mitra et al. | 568/333 |
| 4,694,048 | 9/1987 | Choe | 359/326 |
| 4,694,066 | 9/1987 | DeMartino et al. | 528/373 |
| 4,717,508 | 1/1988 | DeMartino | 359/326 |
| 4,719,281 | 1/1988 | Choe | 359/326 |
| 4,720,355 | 1/1988 | DeMartino | 359/326 |
| 4,757,130 | 7/1988 | DeMartino | 528/288 |
| 4,766,171 | 8/1988 | DeMartino | 359/326 |
| 4,774,025 | 9/1988 | Choe et al. | 252/582 |
| 4,779,961 | 10/1988 | DeMartino | 350/350 R |
| 4,801,659 | 1/1989 | Leslie | 359/326 |
| 4,801,670 | 1/1989 | DeMartino et al. | 359/328 |
| 4,818,899 | 4/1989 | Tiers | 307/425 |
| 4,831,109 | 5/1989 | Mitra et al. | 528/125 |
| 4,835,081 | 5/1989 | Ong et al. | 430/59 |
| 4,851,502 | 7/1989 | DeMartino | 528/291 |
| 4,855,078 | 8/1989 | Leslie | 359/326 |
| 4,887,889 | 12/1989 | Leslie | 359/326 |
| 4,985,528 | 1/1991 | Mignani et al. | 528/85 |
| 5,001,209 | 3/1991 | Wreesmann et al. | 528/76 |
| 5,034,277 | 7/1991 | Laschewsky et al. | 428/412 |
| 5,037,935 | 8/1991 | Gulotty et al. | 528/272 |
| 5,059,002 | 10/1991 | Francis et al. | 359/328 |
| 5,093,456 | 3/1992 | Mitra et al. | 528/73 |
| 5,106,936 | 4/1992 | Gulotty et al. | 528/272 |

FOREIGN PATENT DOCUMENTS

| | | |
|---|---|---|
| 0185248 | 6/1986 | European Pat. Off. |
| 0243806 | 11/1987 | European Pat. Off. |
| 00247476 | 12/1987 | European Pat. Off. |
| 0297530 | 1/1989 | European Pat. Off. |
| 1131226 | 6/1962 | Fed. Rep. of Germany |
| 3807522 | 3/1989 | Fed. Rep. of Germany |

OTHER PUBLICATIONS

T. Kurihara et al., "A New Organic Material Exhibiting Highly Efficient Phase-matched Second Harmonic Generation: 4-methoxy-4-nitrotolan," *J. Chem. Soc. Chem. Commun.*, 959–960 (1987).

J. Mori and T. Kaino, "Molecular Orbitals of Benzoxadiazole Compounds with Optical Nonlinearities", *Physics Letters A*, 127, pp. 259–262 (1988).

*Primary Examiner*—John Kight, III
*Assistant Examiner*—Raben Sergent
*Attorney, Agent, or Firm*—Gary L. Griswold; Walter N. Kirn; Lorraine R. Sherman

[57] ABSTRACT

This invention provides synthetic routes for novel single isomers of monocarbamate diols and their polymerization to provide novel polyesters, polyurethanes, polycarbonates, and the like having pendant carbamate groups on the polymer chain. Devices using some of these novel polymers which demonstrate nonlinear optical activity are also disclosed.

7 Claims, 1 Drawing Sheet

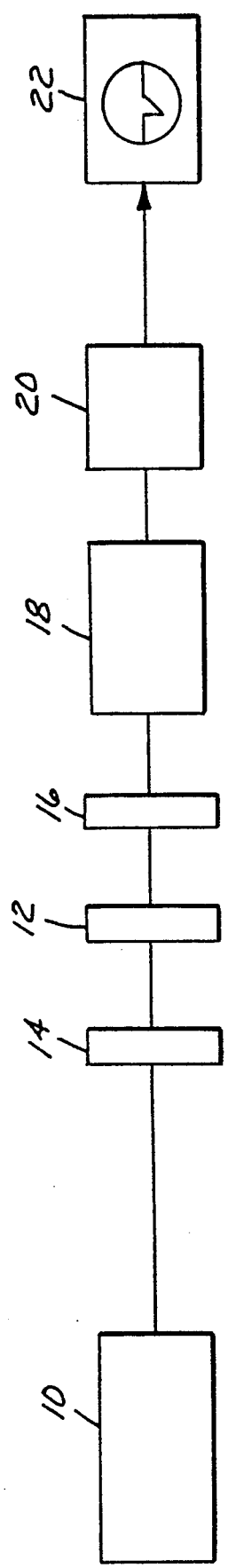

COATED SUBSTRATES COMPRISING POLYMERS DERIVED FROM MONOCARBAMATE DIOLS

This is a division of application Ser. No. 07/760,862 filed Sep. 16, 1991, now U.S. Pat. No. 5,163,060, which was a divisional of U.S. Ser. No. 07/365,965, filed Jun. 14, 1989, now U.S. Pat. No. 5,093,456.

FIELD OF THE INVENTION

This invention relates to monocarbamate diols and a method therefor, the diols having pendant carbamate groups. These diols are useful in the preparation of polymers such as polyurethanes, polyesters, polycarbonates and the like that have improved mechanical and thermal properties and are useful in the resin and plastics industries. Some of these polymers further exhibit nonlinear optical properties and are useful in nonlinear optical devices, such as second harmonic generators. In another aspect, a novel method is disclosed for providing pure monocarbamate diols, which are precursors of the novel polymers.

BACKGROUND OF THE INVENTION

Multifunctional alcohols including glycols, glycerols and higher polyhydric alcohols as components in the preparation of polymers such as polyesters, polyurethanes, polycarbonates, polyethers and the like are widely used in the resins and plastics industry. A variety of glycols are commonly used for preparing linear polymers and as chain extenders to increase molecular weights or to introduce 'block' segments in polymers to impart specific properties.

Appropriate functional groups in functionalized diols can improve properties of polymers prepared from them. For example, U.S. Pat. No. 4,248,994 teaches use of polyols, containing at least one carboxamide group in the polyol backbone, in the preparation of polyurethane resins. These resins can be formed in the fluid state and show accelerated curing characteristics without adversely affecting pot life of the resin or the physical properties of the cured resin. U.S. Pat. No. 4,107,151 discloses use of a polyol, containing at least one urethane bond, in the preparation of a urethane elastomer. The elastomers exhibited short mold separation period, high initial strength after gelation, lack of phase separation, and no significant sacrifice in pot-life or chemical stability.

Urethane or carbamate containing diols, where one or more carbamate groups link the two hydroxy functions, are well known in the art. These diols are prepared by an extension of the method of ring opening reaction of cyclic carbonates with amines as taught in U.S. Pat. Nos. 2,627,524 and 3,703,538. U.S. Pat. No. 3,248,373 describes the reaction of diamines with two equivalents of cyclic carbonates to give bis(betahydroxyalkyl)carbamates useful as polyurethane chain extenders. U.S. Pat. Nos. 4,126,747 and 4,161,596 disclose similar procedures for making carbamate diols which are intermediates for olefinic monomers. U.S. Pat. Nos. 3,595,814 and 4,177,342 teach use of the same aminoalcohols with cyclic carbonates. U.S. Pat. No. 4,500,717 describes ring opening of a cyclic carbonate with a preformed carbamate monoalcohol to prepare carbamate diols.

Polyols, in particular diols, containing a urethane or carbamate group in the side chain are less well described. These side chain carbamate monomers have the added advantage that during long term usage of the polymers therefrom, any hydrolytic cleavage of the carbamate group would not significantly alter molecular weights of the polymers, and mechanical integrity of devices prepared from them would be sustained. Such monomers have been described in U.S. Pat. No. 2,928,812 as components for condensation with formaldehyde and urea to give water dispersible polymers. However, hydroxyalkyl carbamates described therein are again prepared by the ring opening of glyceryl carbonate with ammonia and are limited to N-unsubstituted carbamates.

Asymmetric substitution pattern of glyceryl carbonate also results in a mixture of two possible carbamate diols, 2,3-dihydroxypropyl carbamate and 2-hydroxy-1-hydroxymethyl ethyl carbamate by the above synthetic method. This method requires a tedious and expensive separation of isomeric products to obtain pure isomers. U.S. Pat. No. 4,177,342 extended this concept by using amines instead of ammonia to give N-substituted carbamate diols, further usable as components for polyurethanes. Disadvantages of asymmetric substitution obtained from cyclic carbonates again resulted in mixtures of isomeric products from the ring opening reaction as mentioned above. Use of such an isomeric mixture of monocarbamate diols in polymerization results in randomized spacing of side chain carbamate groups along the polymer backbone and randomly removes spacer alkylene groups between the side chain carbamate function and the polymer backbone. The effect of both of these factors is to reduce intramolecular interactions between the NLO active carbamate substituents.

Another procedure that has been taught for making branched urethane diols involves the non-stoichiometric reaction of a triol with a monoisocyanate. U.S. Pat. No. 4,107,151 describes the reaction of one equivalent of a triol with one equivalent of a monoisocyanate to form monocarbamate diols. This method has limitations both from lack of regiospecificity, giving a mixture of possible monocarbamate diols, and from possibilities of forming di- and tri-carbamates in the mixture. Use of such a mixture in polymerization reactions seriously reduces molecular weights and causes premature gelling. This method can also prove inadequate in the present invention for preparing pure monocarbamate diols, especially as a nonlinear optically (NLO) active comonomer. A slight amount of cross-linking can severely inhibit poling the resulting polymer to make a useful NLO material.

The present invention teaches a generalized synthesis of carbamate diols which provides pure single isomers, useful in polymers, some of which in turn are useful in nonlinear optics.

Laser techniques have been developed so that it is possible to obtain a limited number of fundamental frequencies of coherent laser light by utilizing solid, gas, and liquid media. However, in many applications, laser light having frequencies not among the fundamental frequencies obtainable is required, and in some cases laser light exhibiting a continuous spectrum over a certain range of frequencies is required. Nonlinear optical crystals have, therefore, frequently been employed to convert coherent laser light of a fundamental frequency into laser light of the second harmonic, that is to say, laser light with a frequency twice the fundamental frequency.

U.S. patents relating to nonlinear optical properties of organic materials include U.S. Pat. Nos. 4,774,025, 4,779,961, and 4,818,899.

Recent publications relating to nonlinear optical properties of organic materials include T. Kurihara et al., "A New Organic Material Exhibiting Highly Efficient Phase-matched Second Harmonic Generation: 4-Methoxy-4'-nitrotolan", *J. Chem. Soc., Chem. Commun.*, 959–960, (1987); and J. Mori and T. Kaino, "Molecular Orbitals of Benzoxadiazole Compounds with Optical Nonlinearities", *Physics Letters A*, 127, pp 259–262 (1988).

SUMMARY OF THE INVENTION

Use of organic molecules in nonlinear optical devices has generated much interest recently because a large number of molecules are available for investigation. Some substituted aromatic molecules are known to exhibit large optical nonlinearities. The possibility of such an aromatic molecule having large optical nonlinearities is enhanced if the molecule has electron donor and acceptor groups bonded to the conjugated system of the molecule. Potential utility for very high frequency application of organic materials having large second-order nonlinearities is greater than that for conventional inorganic electro-optic materials because of the bandwidth limitations of inorganic materials. Furthermore, properties of organic materials can be varied to optimize mechanical and thermo-oxidative stability and laser damage threshold.

Briefly, the present invention provides a polymer represented by the formula:

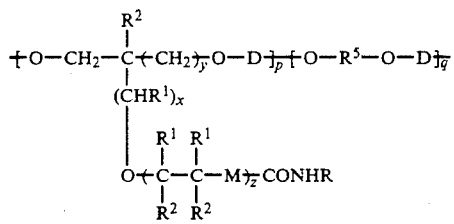

wherein

R is an alkyl, alkenyl or aryl group having 1 to 20 carbon atoms which can be substituted by any non proton-donating group, i.e., non active hydrogen-containing group, as determined by the method of Zerewitinoff, as described by Kohler, Stone, and Fuson in *J. Am. Chem. Soc.*, 49, 3181 (1927), which is preferably halogen (Cl, F, Br), $NO_2$, CN, an aldehyde group or an acyl group having 1 to 10 carbon atoms, or an aroyl group having 6 to 10 carbon atoms;

$R^1$ and $R^2$ can be the same or different and each is selected from hydrogen and alkyl, alkenyl, alkoxyalkyl, aryl, aryloxyalkyl, alkoxyaryl, aralkyl or alkaryl groups, wherein $R^1$ and $R^2$ each total from zero to forty carbon atoms, or a pair of $R^1$ and $R^2$ together with the carbon atoms to which they are joined can form an aliphatic cyclic structure of 5 to 7 atoms which can include carbon and zero to two unitary ring heteroatoms selected from oxygen, nitrogen, and sulfur atoms; $R^1$ and $R^2$ can be substituted by a non proton-donating group, i.e., non active hydrogen-containing group as determined by the method of Zerewitinoff, as described by Kohler et al., supra, and which preferably is halogen (Cl, F, Br), $NO_2$, CN, aldehyde group or an acyl group having 1 to 10 carbon atoms, or an aroyl group having 6 to 10 carbon atoms;

D can be

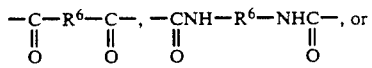

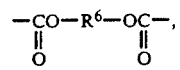

$R^5$ and $R^6$ can be the same or different, and each is a divalent organic group selected from (1) aliphatic groups having 1 to 20 carbon atoms and up to 19 unitary, catenary (backbone) atoms or groups selected from —O—, —S—, and —$NR^7$—, in which $R^7$ is lower alkyl group having one to four carbon atoms, (2) cycloaliphatic groups having 5 to 12 carbon atoms, optionally having one ring —O—, —S—, or —$NR^7$— atom or group therein, and (3) arylene groups having 6 to 12 carbon atoms;

M is a unitary heteroatom selected from —O— and —S—;

p is an integer having a value from 1 to 10,000;

q is an integer which can be zero or greater than zero such that when q is not zero, then the ratio of q to p can be in the range of 1:10,000 to 10,000:1. When q is equal to zero, a homopolymer of pendant carbamate moieties results;

x is an integer from 0 to 20;

y can be zero or 1 provided that at least one of x and y is not zero; and z is an integer from zero to twenty;

In another aspect, the present invention provides second harmonic generators which comprise, in combination, a laser source of coherent light radiation at a fixed fundamental frequency, NLO-active materials as the second harmonic generators, means for poling the polymer, means for directing the output radiation of the laser onto polymeric materials of this invention, the poled polymers derived therefrom to provide output radiation of a second harmonic frequency, and output means for utilizing the resultant second harmonic frequency.

Devices that are capable of generating coherent second harmonic light radiation with materials of this invention described herein are well known in the art. Representative examples of such devices are described in U.S. Pat. Nos. 3,395,329; 3,431,484; and 3,858,124, all of which are incorporated herein by reference for the purpose of describing devices which can incorporate the NLO optically active materials of the present invention, and which also exhibit second harmonic generation.

In another aspect, the present invention relates to a process for preparing pure monocarbamate diols of general formula I:

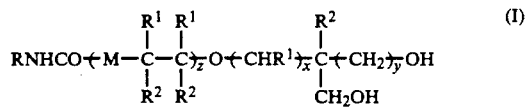

where R, $R^1$, $R^2$, M, x, y and z are as defined above;

The background art teaches the preparation of these side chain carbamate diols by nondiscriminating reaction pathways that lead to mixtures of isomeric products. Use of such mixtures in polymerization leads to premature gelling and to reduction in molecular weight. In contrast, the present invention teaches a generalized synthesis of side chain carbamate diols which leads to pure, single isomers which in turn provides polymers of higher molecular weight without gelling. Some of the polymers are useful in nonlinear optical applications.

In still another aspect, carbamate diols prepared by the method of the present invention can be incorporated into polymers such as polyesters, polycarbonates, polyurethanes, and the like wherein carbamate moieties are pendant to the polymer backbones.

In yet a further aspect, the present invention teaches a method for polymerizing diols of the invention, optionally in the presence of different copolymerizable diols, to give polable NLO polymers used in such devices as optical switches, modulation and frequency doubling. These polymers can be coated onto a substrate by various techniques known in the art (e.g., spin coating or use of doctor blade) from solutions of the polymer in a suitable solvent such as ethyl acetate, 1,2-dichloroethane and the like. The resultant layered structure is then poled in a known manner as reported by D. S. Chelma and J. Zyss in *Nonlinear Optical Properties of Organic Molecules and Crystals*, Vol. 1, Chapter 11–7, pp. 405–35 (1987).

In still a further aspect, the present invention provides a process for converting a fixed fundamental frequency of coherent laser light into a second harmonic frequency which comprises the steps of providing a polymer of this invention wherein R in Formula I is a conjugated aromatic nucleus substituted with at least one electron withdrawing group, poling said polymer, passing said laser light through said poled polymer to provide output radiation of a second harmonic frequency, said polymer being optically transparent to said fixed fundamental frequency and to said second harmonic frequency.

In this application:

"typical polyols" means those hydrocarbyl polyols that are dihydric or polyhydric alcohols bearing a plurality of hydroxy groups;

"poling" means aligning polar groups of a polymer in an electric field;

"second harmonic light" means light with a frequency twice the fundamental frequency;

"gelling" means formation of cross-linked molecules extending over the total volume of a composition, but remaining swollen by solvent;

"functional diols" means an organic molecule bearing two hydroxy groups and a third non-hydrocarbon group, which is specifically a carbamate group, such as RNHCOO— for example;

"polymer backbone" means the sequence of connected atoms in the polymer molecule which have formed during polymerization of monomer and which therefore contains repeat units of the monomer;

"pendantly incorporated" means that moities such as carbamate moities, attach to, and hang from repeat monomer units, i.e., are not in the polymer backbone;

"catenary" means in the main polymer chain and not a pendant or end group;

"optically transparent" means transparent or light transmitting with respect to incident fundamental light frequencies and harmonic light frequencies. In a laser frequency converter, a present invention nonlinear optical lens polymer is transparent to both the incident and exit light frequencies; and "carbamate" as used in this application includes carbamate (—NHCOO—) and thiocarbamate (—NHCOS—).

DESCRIPTION OF THE DRAWING

The Drawing is a diagrammatic representation of a device capable of generating coherent second harmonic light radiation with certain polymers of this invention.

As shown in the Drawing, infrared radiation at 1064 nm from a laser, for example, from a Q-switched Nd-YAG (neodymium, yttrium, aluminum, garnet) laser 10 was weakly focused through a filter 14 (Corning CS2-60 color filter (Corning Glass Works, Corning, N.Y.) used to block any radiation at 532 nm) onto cell 12 containing the prepared sample. In the device illustrated in the Drawing, the means for directing output radiation of the laser, e.g. a lens, first through filter 14 and then onto cell 12 containing a poled polymer (e.g., see Example 24) was integrated into laser 10 and is not shown as a separate component. Additional means for directing output radiation of the laser (e.g., prisms and diffraction gratings) onto the poled polymer are well-known to one of ordinary skill in the art. An infrared blocking filter 16 placed behind the sample allowed only second harmonic frequency generation to pass through a ⅓ meter monochromator 18 tuned at 532 nm. Output of monochromator 18 was directed to a photomultiplier tube 20, and the resulting signal was processed by boxcar averager 22 which averages signals over many laser pulses. Other laser sources such as solid-state laser sources may be used in place of Q-switched Nd-YAG laser 10.

DETAILED DESCRIPTION OF THE INVENTION

Pure carbamate diols which can be prepared by the process of the present invention can be represented by Formula I:

$$\text{RNHCO} \underset{R^2}{\overset{R^1}{+}} M - \underset{R^2}{\overset{R^1}{C}} - \underset{R^2}{\overset{R^1}{C}} )_z O \underset{}{+} CHR^1 )_x \underset{CH_2OH}{\overset{R^2}{C}} + CH_2 )_y OH \quad (I)$$

where R, $R^1$, $R^2$, M, x, y, and z are as defined above.

Magnitudes of the nonlinearity of the NLO moiety of these diols have been measured on model compounds by electric field induced second harmonic generation (EFISH) and have been shown to be between 0.8 to 1.3 times that of p-nitroaniline, a molecule well known to demonstrate NLO properties, as shown in Table 1.

TABLE 1

Electric Field Induced Second Harmonic Generation (SHG) for:

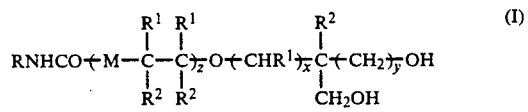

| Compound | A | (mu) (beta)* |
|---|---|---|
| 1 | $CH_3$ | 0.8 |
| 2 | $CH_3(CH_2)_7$ | 1.0 |
| 3 | $CH_3(CH_2)_{11}$ | 1.3 |

*dipole moment times molecular hyperpolarizability relative to p-nitroaniline (see Chelma and Zyss, supra).

Other p-nitroaniline derivatives and related compounds which have been incorporated in polymeric systems and poled to exhibit very large SHG effects have been reported by Ye et al., "Rational Construction of Polymeric Nonlinear Optical Materials," *Materials Research Society Symposium Proceedings*, 109, pp 263-269 (1988).

For the purpose of the NLO portion of this invention, R in Formula I can be a conjugated aromatic nucleus substituted with at least one electron withdrawing group, preferably a nitro, trifluoro, tricyanovinyl, dicyanovinyl, or cyano group and most preferably a nitro group; $R^1$ being preferably an alkyl or alkoxyalkyl group.

Pure carbamate diols described above can be prepared by conventional acidic hydrolysis of the corresponding carbamate functional cyclic acetals or ketals of Formula II:

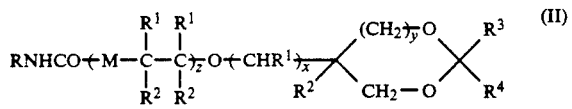

where R, $R^1$, $R^2$, M, x, y, and z are as defined above and $R^3$ and $R^4$ can be independently H, alkyl, aryl, alkoxyaryl, aryloxyalkyl, aralkyl or alkaryl, wherein together $R^3$ and $R^4$ can total from zero to 40 carbon atoms; or $R^3$ and $R^4$ together with the carbon atom to which they are joined can form a cyclic aliphatic structure having 5 to 7 carbon atoms and up to 2 unitary ring atoms selected from nitrogen, sulfur, and oxygen atoms. Cyclic ketals where $R^3$ and $R^4 = CH_3$, are particularly susceptible to acidic cleavage. Organic or nonoxidizing inorganic acids may be used for this hydrolysis and aqueous mixtures of some non-interfering organic solvents may be used for this reaction to promote homogeneity in the reaction medium. By non-interfering organic solvents is meant a solvent that does not react chemically with functional groups in compounds (I) and (II) under hydrolysis conditions.

The method of preparing pure monocarbamate diols of Formula I comprises the steps of:
(1) providing the corresponding carbamate functional cyclic acetal or ketal of a compound of Formula II and dissolving the acetal or ketal in an aqueous mixture of non-interfering organic solvent to provide an acid mixture preferably having a pH of about 1 to 2; the acidity can be adjusted by addition of organic or nonoxidizing inorganic acid;
(2) hydrolyzing the cyclic acetal or ketal group; and
(3) isolating the resulting carbamate diol by removing excess acid; optionally, the carbamate diol can be purified by recrystallization or distillation.

Methanol is a preferred organic solvent for this purpose although other water soluble alcohols may be used such as ethanol, propanol and the like. Acetic (HOAc) or hydrochloric acid (HCl) are the preferred acids for the above described method of the present invention although other carboxylic or nonoxidizing inorganic acids may be used. Examples of useful carboxylic acids include formic acid, acetic acid, oxalic acid, p-toluenesulfonic acid, trifluoromethanesulfonic acid, and the like. Examples of useful nonoxidizing inorganic acids include sulfuric acid, hydrochloric acid, phosphoric acid and the like. Strongly acidic ion exchange resins such as those available under the trade names of Duolite TM (Rohm & Haas Co., Philadelphia, Pa.), Amberlite TM (Rohm & Haas Co.) or Dowex TM (Dow Chemical Co., Midland, Mich.) may also be used in which case the acidic reagent is readily and subsequently removed from the reaction mixture by filtration.

Typically, a carbamate acetal or ketal (II) is dissolved in methanol/water mixtures, and the pH is adjusted to about 1 to 2 by addition of acid such as hydrochloric acid or acetic acid. Stirring preferably at room temperature (e.g., about 20° to 30° C.) for 16-18 hrs followed, optionally, by appropriate heating or refluxing of the mixture results in nearly quantitative cleavage of the cyclic acetal or ketal group to produce the carbamate diol (I). Hydrolysis can be monitored and followed to completion by infrared (IR) spectroscopy to determine removal (disappearance in the IR) of the cyclic ketal group which has a characteristic IR absorption at about 1380 $cm^{-1}$. Acid may be removed by evaporation under vacuum or by neutralization with an inorganic base such as aqueous sodium bicarbonate. Carbamate diol (I) can be isolated, for example, by filtration and purified, for example, by recrystallization or distillation techniques well known in the art. Purity of these materials can be verified by spectroscopic means.

Carbamate cyclic acetals or ketals (II) are prepared by reaction of equivalent amounts of organic isocyanates, R—NCO, where R is as defined above, and cyclic acetals or ketals of Formula III:

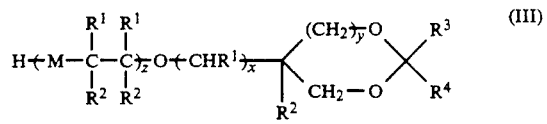

where $R^1$, $R^2$, $R^3$, $R^4$, M, x, y, and z are as defined above. A variety of isocyanates may be used for this reaction, e.g. alkyl isocyanates like methyl isocyanate, ethyl isocyanate, propyl isocyanate, isopropyl isocyanate, butyl isocyanate, tertiary butyl isocyanate, hexyl isocyanate, octyl isocyanate, dodecyl isocyanate, etc., cycloalkyl isocyanates like cyclohexyl isocyanate, alkenyl isocyanates like allyl isocyanate, aryl isocyanates like phenyl isocyanate, 1- and 2-naphthyl isocyanate and substituted isocyanates like 4-nitrophenyl isocyanate, 2-methoxy-4-nitrophenyl isocyanate, 2-chloro-4-nitrophenyl isocyanate, and 4-(trifluoromethyl)-phenyl isocyanate, all of which are commercially available.

Reaction between an isocyanate and acetals or ketals of Formula III may be carried out in the absence of solvents at temperatures at or below room temperature and sometimes a brief warming to about 70° C. is used subsequently. It is also possible to carry out this reaction in the presence of non-interfering solvents whose boiling points are sufficiently low to allow subsequent removal by evaporation and/or distillation, such as halogenated hydrocarbons, ethers, ketones or esters, aliphatic or aromatic hydrocarbons or polar aprotic solvents like N,N-dimethylformamide or dimethylsulphoxide. Equivalent amounts of the isocyanate and the acetals or ketals are used for this reaction. Appropriate catalysts like tertiary amines or tin compounds, that are well known in the art of urethane preparation, may be used for this reaction.

Completion of reaction can be easily followed by monitoring a reaction mixture by infrared spectroscopy until isocyanate absorption at 2200 to 2300 $cm^{-1}$ is substantially absent. When carried out in the absence of a solvent, the reaction product yields the carbamate acetal or ketal in pure form and usually no further purification is necessary. Solvents, when used, can be removed by vacuum distillation. Traces of any catalyst may be carried through to the subsequent hydrolysis step described above or may be removed at this stage by washing the product with appropriate liquids as is well known in the art.

Some of the hydroxy acetals or ketals are commercially available. Generally, however, the hydroxy acetal or ketal (III, where z is zero) is readily prepared by the cyclization reaction of a triol of Formula (IV) with an aldehyde or ketone of Formula (V):

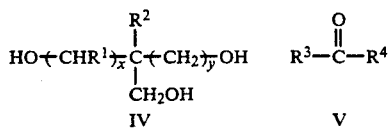

where $R^1$, $R^2$, $R^3$, $R^4$, x, and y are as defined above A variety of triols may be used for this purpose, e.g., glycerol, 2-methylglycerol, 1,2,3-butanetriol, 1,2,4-butanetriol, 1,2,5-pentanetriol, 1,2,6-hexanetriol, 2-methyl-1,2,3-butanetriol, 2-hydroxymethyl-1,3-propanediol, 2-hydroxymethyl-1,3-butanediol, 2-hydroxymethyl-1,4-butanediol, 2-hydroxymethyl-1,5-pentanediol, 2,2-bis(hydroxymethyl)-3-methylhexanol, 2,2-bis(hydroxymethyl)-3-ethylpentanol, 2-hydroxymethyl-2-methyl-1,3-propanediol, 2-hydroxymethyl-2-methyl-1,3-butanediol, 1-phenylglycerol, 2-phenylglycerol, 2-hydroxymethyl-1-phenyl-1,3-propanediol and 2-hydroxymethyl-2-phenyl-1,3-propanediol, all of which are commercially available.

The method of synthesis of the hydroxy acetal or ketal (III, where z is zero) from the triol (IV) is described in U.S. Pat. No. 4,691,059, columns 6 and 7.

Aldehyde or ketone (V) needed for preparing hydroxy acetal or ketal (III, where z is zero) may be chosen from a wide variety of materials, many of which are commercially available, the more common ones being formaldehyde, acetaldehyde, propionaldehyde, isobutyraldehyde, chloral, benzaldehyde, o , m-, or p-nitrobenzaldehyde, m-chlorobenzaldehyde, anisaldehyde, furfural, acetone, methyl ethyl ketone, methyl isobutyl ketone, cyclopentanone, cyclohexanone, 3-methylcyclohexanone, acetophenone, benzophenone and the like. Acetone is the preferred ketone for the practice of this invention.

Hydroxy acetal or ketal (III, where z is zero) may be chain extended on the free hydroxy functional group to introduce the $-(M-CR^1R^2-CR^1R^2)-$ moiety to give acetals or ketals (III, where z is 1 to 20). This is carried out by reaction of hydroxy acetal or ketal (III, where z is 0) with oxiranes or thiiranes of formula

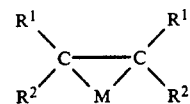

where M, $R^1$ and $R^2$ are as defined above. Some examples of oxiranes that may be used are ethylene oxide, propylene oxide, 1,2-epoxybutane, 2,3-epoxybutane, 1,2-epoxyhexane, 1,2-epoxyoctane, 1,2-epoxydecane, and the like, all of which are commercially available. Examples of useful thiiranes are commercially available ethylene sulfide, propylene sulfide, butylene sulfide, and the like. Chain extension through these epoxides or thiiranes may be carried out by polymerization methods as described by George Odian in "Principles of Polymerization", pp 512–15, 547, (2nd Edition, John Wiley and Sons, N.Y., (1981)).

A preferred carbamate diol of Formula I of this invention is 1,2-dihydroxy-8-n-octyl-p-nitrophenyl carbamate:

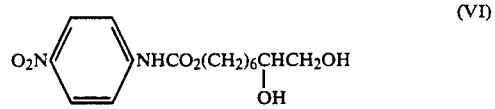

This diol can be prepared, as shown in the sequence of chemical equations below, from readily available 7-octene-1,2-diol (VII) which is first ketalized or acetalized as described in U.S. Pat. No. 4,691,059 (columns 6 and 7) by compounds of structure (V) followed by subsequent hydration of the terminal double bond to give the anti-Markovnikov's primary alcohol of Formula (VIII) below. The alcohol is then reacted with 4-nitrophenyl isocyanate and processed to remove the ketal as described in U.S. Pat. No. 4,691,059 (columns 9 and 10) to give the compound represented by Formula (VI) below. Subsequent reaction of the compound of Formula (VI) with at least one of a diisocyanate, a carboxylic diacid halide or anhydride, and a bischloroformate, and optionally, a copolymerizable diol as disclosed below provides condensation polymers of the invention wherein $R^1$ and $R^2$ are hydrogen; R is p-nitrophenyl; x is 6; y and z are zero; and $R^5$, D, p, and q are as defined above. The chemical reactions involved are shown in Chemical Equations I, below.

CHEMICAL EQUATIONS I

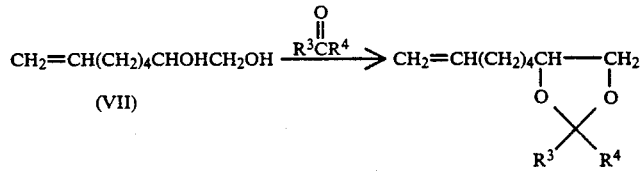

1) $(CH_3)_2S\ BH_3$/ether
2) ethanol/NaOH
3) $H_2O_2$

-continued
CHEMICAL EQUATIONS I

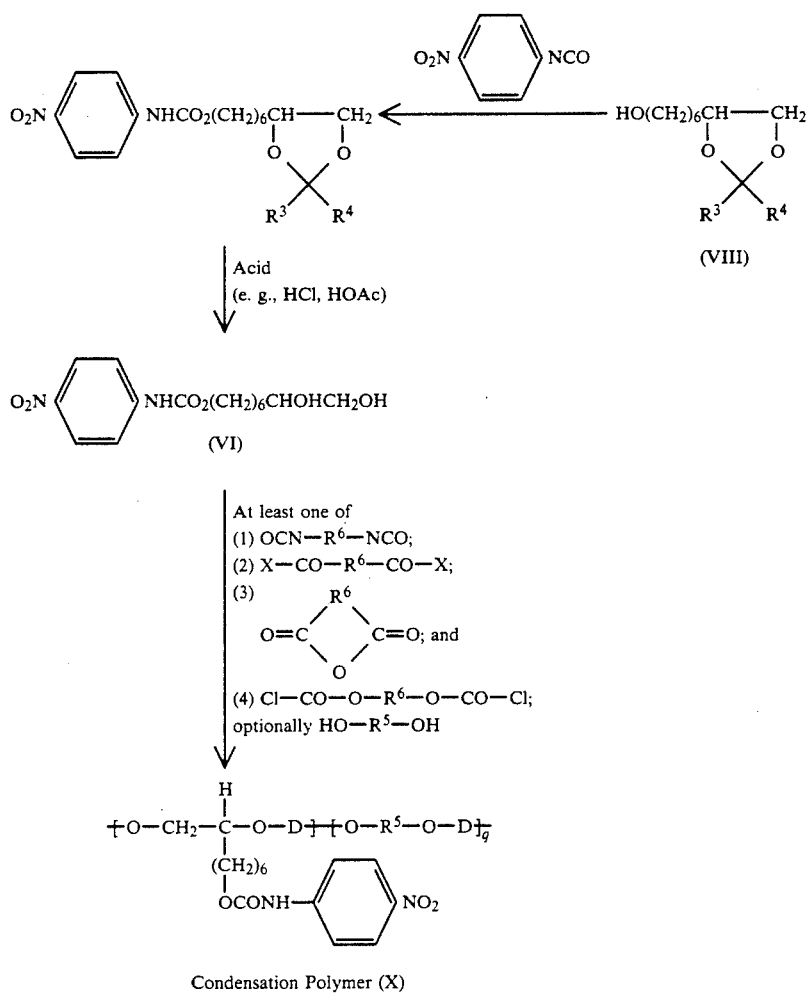

Condensation Polymer (X)

The present invention teaches homopolymers and random co-polymers prepared with side chain carbamate diols, the polymers being selected from the group comprising for example, polyurethanes, polyesters, polycarbonates, and the like wherein the carbamate moieties are pendantly incorporated into the condensation polymers. Polymers prepared in this invention, represented by formula IX below, are prepared as shown in Chemical Equations II:

CHEMICAL EQUATIONS II

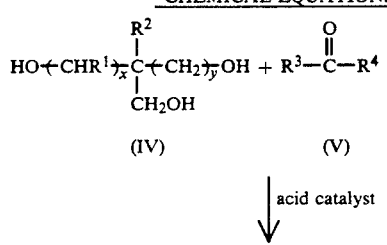

-continued
CHEMICAL EQUATIONS II

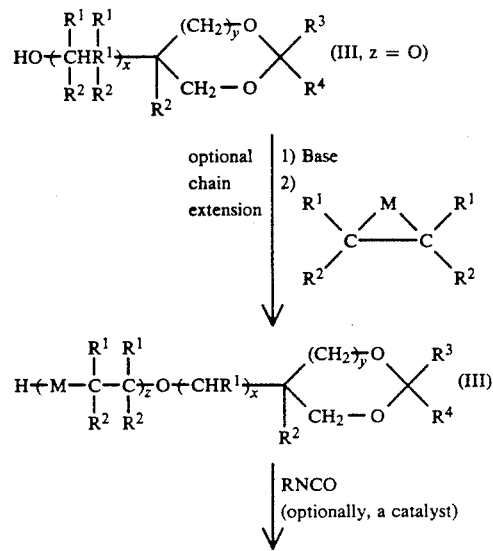

-continued
CHEMICAL EQUATIONS II

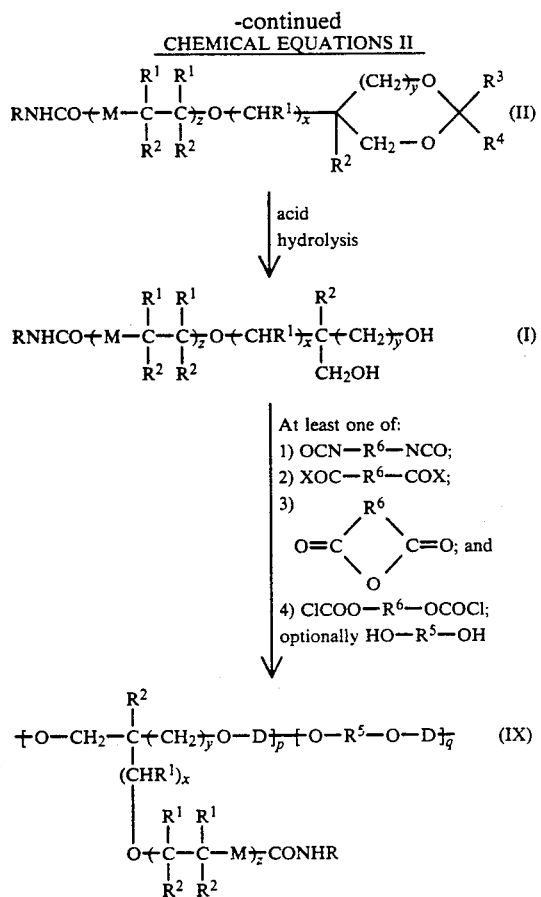

wherein R, $R^1$, $R^2$, $R^5$, M, D, x, y, z, p and q are as defined above. D, which contains $R^6$, can be derived from a diisocyanate, a carboxylic diacid halide or anhydride, or a bischloroformate, when any of these groups react with hydroxyl groups of a carbamate diol of the invention, optionally in the presence of a copolymerizable diol which contains $R^5$. The polymers are prepared by the reaction of:

a) 0.005 to 50 mole percent of the carbamate diol of this invention;
b) 0 to 49.995 mole percent of other copolymerizable diols of structure OH—$R^5$—OH; and
c) 50 mole percent of at least one of a diisocyanate, a carboxylic diacid halide or anhydride, and bischloroformate.

Polymeric number average molecular weights of polymers (IX) and (X) are in the range of one thousand to ten million, preferably ten thousand to one million.

Polyurethanes can be prepared from the carbamate diols of the present invention by reaction of equivalent amounts of the carbamate diols and appropriate organic diisocyanates of general formula OCN—$R^6$—NCO wherein $R^6$ can be any divalent organic group selected from (1) aliphatic groups having 1 to 20 carbon atoms and up to 19 unitary, catenary (backbone) atoms or groups selected from —O—, —S—, and —$NR^7$—, in which $R^7$ is lower alkyl group having one to four carbon atoms, (2) cycloaliphatic groups having 5 to 12 carbon atoms, optionally having one ring —O—, —S—, or —$NR^7$— atom or group therein, and (3) arylene groups having 6 to 12 carbon atoms. Commercially available alkylene diisocyanates, cycloalkylene diisocyanates and arylene diisocyanates may be used in the practice of the present invention. Alkylene diisocyanates that may be used include, tetramethylene diisocyanate, hexamethylene diisocyanate, trimethyl hexamethylene diisocyanate and the like. Cycloalkylene diisocyanates that may be used in the present invention include, for example, isophorone diisocyanate, and 4,4'-methylene-bis(cyclohexyl isocyanate), and the like. Useful arylene diisocyanates include, for example, p-phenylene diisocyanate, 2,4-toluene diisocyanate, 4,4'-methylene-bis(phenyl isocyanate), and the like.

Polyesters (carboxylic acid esters) from these carbamate diols are prepared by reacting the carbamate diols of the invention in a basic organic solvent such as pyridine or other tertiary amines with an equivalent amount of carboxylic diacid halides of general formula X—CO—$R^6$—CO—X where X is F, Cl, or Br, e.g., succinyl chloride, succinyl bromide, adipoyl chloride, sebacoyl chloride, terephthaloyl chloride, 1,4-cyclohexanedicarboxyl fluoride, all of which are commercially available, or mixtures thereof, and $R^6$ is as defined above. Polyesters from these carbamate diols can also be prepared by reacting the carbamate diols of the invention with equivalent amounts of carboxylic diacid anhydrides of the general formula

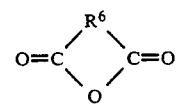

as is well known in the art.

Polycarbonates from these carbamate diols are prepared by reacting carbamate diols of this invention in a basic organic solvent such as pyridine or other tertiary amines with an equivalent amount of organic bischloroformate of the general formula Cl—CO—O—$R^6$—O—CO—Cl, wherein $R^6$ is as defined above. Such bischloroformates are themselves the reaction products of diols of the formula HO—$R^6$—OH with two equivalents of phosgene, wherein $R^6$ is as defined above. Preferred diols of the formula HO—$R^6$—OH are diphenols such as 2,2'-, 4,4'- or 2,4'-biphenols, bis(2-hydroxyphenyl) methane, bis(4-hydroxyphenyl)methane, hydroquinone, 4,4'-isopropylidenediphenol (Bisphenol A), 4,4'-isopropylidene-(2,6-dichlorophenol), resorcinol, and the like, all of which are commercially available. Polycarbonates from carbamate diols of this invention may also be prepared by co-condensation of carbamate diols and diols of formula HO—$R^6$—OH with appropriate carbonates like diphenyl carbonate.

In the syntheses of the polymers described above, catalysts such as tertiary amines or tin compounds that are known in the art of polyurethane formation may be utilized. Representative catalysts include tributylamine, triethylamine, diazabicyclooctane, dibutyltin dilaurate and combinations thereof. Catalysts can be present in an amount in the range of 0.1 to 10 weight percent of the total composition.

Inert solvents, for example, ketones, esters, ethers, and amides may also be used as diluents and the reaction may be carried out anywhere from room temperature to reflux conditions until reaction is complete as indicated by disappearance of the IR-monitored isocyanate absorption band. When inert solvents are used, the polymers are recovered by precipitation techniques and purified by reprecipitation methods well known in the art.

In the syntheses of the polymers, polyurethanes, polyesters, and polycarbonates described above, additional diols of formula HO—$R^5$—OH where $R^5$ is as defined above may be used along with the carbamate diols of the invention to prepare copolymers. Suitable additional diols include alkylene glycols such as 1,2-ethanediol, 1,3-propanediol, 1,4-butanediol, 1,3-cyclopentanediol, 1,4-cyclohexanediol, 2-ethyl 1,6-hexanediol, 1,4-bis(hydroxymethyl)cyclohexane, 1,4-benzenedimethanol, 2-(2-hydroxyethoxy)ethanol, 2-[2-(2-hydroxyethoxy)ethoxy]ethanol, 2-(2-hydroxyethylthio)ethanol or 2,2'-(n-methyl)iminodiethanol, all of which are commercially available. Both HO—$R^5$—OH and HO—$R^6$—OH may be polyoxyalkylene diols or polyester diols having alkylene units of 1 to 4 carbon atoms and molecular weights up to 3000 such as polyoxymethylene glycols, polyoxyethylene glycols, polyoxypropylene glycols, polyoxytetramethylene glycols or polycaprolactone diols all of which are commercially available.

Suitable temperatures for polymerization of the monomer components used in the preparation of the polymers of the present invention are in the range of 25° to 250° C., more preferably between 50° to 150° C., and most preferably between 70° and 120° C.

Poling of the polymers of the present invention can be accomplished by any means known in the art. For example, the polymer solution can be first coated onto a glass substrate between poling electrodes. Preferably, the poling electrodes were vapor deposited onto the glass support prior to spin coating the polymer. The polymer was then heated above the glass transition temperature; an electric field in the range $10^4$–$10^7$ v/cm was applied and then the electrodes and coated support were cooled to room temperature whereupon the electric field was removed. The resulting poled polymer emitted second harmonic frequency when exposed to coherent laser light input at a wavelength of 1.58 μm; the light at the second harmonic frequency was detected at a wavelength of 0.79 μm using a monochromator and a photomultiplier tube. Additional discussion relating to poling can be found in col. 16 of U.S. Pat. No. 4,810,338, which patent is incorporated herein by reference.

Polymerizable compositions of this invention can be applied to substrates to obtain articles as layered structures by coating techniques such as dipping, bar coating, roller coating, and other coating techniques well known to those skilled in the art.

Suitable substrates on which the composition may be applied include those substrates that are transparent to actinic radiation in the wavelength range 0.3 to 20 micrometers and include substrates such as quartz, indium-tin oxide, vinyl polymers such as acrylics, for example, polymethyl methacrylate, and the like.

A nonlinear optical component or device of the invention, which can be an optical switch or light modulation device, can comprise the polymer of the invention as the component or as a coating on a substrate.

Articles and coated articles comprising polymers of the invention exhibit improved mechanical and thermal properties such as increased tensile strength and increased elongation at break and heat resistance.

Objects and advantages of this invention are further illustrated by the following examples, but the particular materials and amounts thereof recited in these examples, as well as other conditions and details, should not be construed to unduly limit this invention.

EXAMPLES

Parts and percentages are by weight unless otherwise indicated. All of the compounds prepared in the examples and comparative examples were characterized by conventional analytical techniques, such as: infrared spectroscopy, ultraviolet/visible absorption spectroscopy, nuclear magnetic resonance spectroscopy, melting point, elemental analysis, X-ray powder diffraction and X-ray diffraction single crystal measurements. All temperatures are in degrees Centigrade unless indicated otherwise.

Examples 1–9 describe the synthesis of carbamate cyclic ketals as summarized in Table 2 below.

EXAMPLES 1–9

Syntheses of Carbamate Cyclic Ketals of Formula (II)

Carbamate cyclic ketals of Formula (II) were prepared by the general procedure described below, from the corresponding ketals of Formula (III):

Equivalent amounts of the hydroxy ketal, for example, 2,2-dimethyl-1,3-dioxolane-4-methanol (commonly known as solketal) commercially available from Aldrich Chemical Company, and the organic isocyanate were mixed at temperatures between 5°–10° C. and a catalytic amount of dibutyltin dilaurate (DBTDL) (Alfa Products Division, Morton Thiokol, Inc., Danvers, Mass.) was added. The mixture was subsequently stirred under a nitrogen blanket at room temperature with periodic or internal monitoring of the residual isocyanate band between 2200 to 2300 $cm^{-1}$ in the infrared spectrum of the mixture. Reaction was considered complete when the isocyanate band disappeared completely. No further purification was necessary as the nuclear magnetic resonance spectrum of the mixture at that stage indicated a pure product and hydrolysis to the carbamate diol, Formula (I) could be carried out directly. Results are summarized in Table 2 below.

TABLE 2

| Example | R= | RNCO (g) | Solketal (g) | DBTDL (g) | Time (hrs) |
|---|---|---|---|---|---|
| 1 | n-pr | 17.0 | 26.4 | 0.6 | 16* |
| 2 | n-bu | 19.8 | 26.4 | 1.0 | 16 |
| 3 | t-bu | 19.8 | 26.4 | 0.7 | 16 |
| 4 | allyl | 16.6 | 26.4 | 1.0 | 32 |
| 5 | n-octyl | 6.2 | 5.3 | 0.2 | 5.5 |
| 6 | n-dodecyl | 8.4 | 5.3 | 0.2 | 24 |
| 7 | cyclo-hexyl | 25.0 | 26.4 | 1.0 | 16 |
| 8 | o-tolyl | 20.0 | 19.8 | 1.0 | 16 |
| 9 | p-tolyl | 25.0 | 24.8 | 1.0 | 16 |

*followed by 0.75 hr at 70° C.

Data of TABLE 2 show the preparative conditions for various carbamate cyclic ketals.

EXAMPLES 10–18

Examples 10–18 describe the synthesis of carbamate diols (I).

Carbamate diols (I) were prepared from the carbamate ketals (II) by acid catalyzed hydrolysis in methanolic water medium. A solution of the carbamate ketal in methanol was acidified with glacial acetic acid and water or aqueous hydrochloric acid to a pH of 1–2 and the mixture was stirred either at room temperature or sometimes at elevated temperatures. Progress of hydrolysis was monitored by the characteristic infrared band of the cyclic ketal at 1380 $cm^{-1}$. Reaction was considered complete when this absorption disappeared in the infrared spectrum of the product mixture. When hydrochloric acid was used as the acid, the mixture at this step was neutralized with sodium bicarbonate. When acetic acid was used, this was not necessary. Solutions were then concentrated under reduced pressure to remove solvent and upon standing in the cold, the carbamate diols crystallized from the mixture. Sometimes addition of a little diethyl ether to the mixture before cooling promoted crystallization of the diol. Solid product was separated by filtration, washed with ether and dried under a vacuum. Purity of the product was excellent as confirmed by NMR spectroscopy. Results are summarized in Table 3 below.

TABLE 3

| Example | Carbamate ketal of Example | Acid used for hydrolysis | Time (hrs) |
| --- | --- | --- | --- |
| 10 | 1 | acetic | 18 |
| 11 | 2 | hydrochloric | 16 |
| 12 | 2 | acetic | 16 |
| 13 | 3 | acetic | 16 |
| 14 | 4 | acetic | 16 |
| 15 | 5 | acetic | 16 |
| 16 | 7 | acetic | 16 |
| 17 | 8 | acetic | 16* |
| 18 | 9 | acetic | 16 |

*followed by 2 hrs at 80°.

Data of TABLE 3 show the preparative conditions for the carbamate diols of Formula I by acid hydrolysis of carbamate ketals of Formula II.

EXAMPLE 19

Synthesis of 4(6-hydroxyhexyl)-2,2-dimethyl-1,3-dioxolane

Alkene ketal, 4(5-hexenyl)-2,2-dimethyl-1,3-dioxolane, (0.01 mole) was dissolved in ether (50 mL) in a flask equipped with dropping funnel, condenser and magnetic stirrer. A steady stream of dry nitrogen was bubbled through the solution. The dropping funnel was charged with borane methylsulfide (Aldrich Chemical Co., Milwaukee, Wis.) (5 mL) in ether (25 mL) and added dropwise the alkene ketal solution over 30 mins. and the resulting mixture allowed to warm to room temperature and stirred for 3 hrs. Ethanol was then added to scavenge excess borane followed by sodium hydroxide (5 mL of 3 molar solution) and the resulting solution cooled in an ice bath before hydrogen peroxide (19 mL 30% solution) was added at such a rate that the reaction temperature did not exceed 35° C. After addition of the hydrogen peroxide was completed the reaction mixture was refluxed for 1 hr before it was poured over an ice/water (120 mL) mixture. The mixture was saturated with sodium chloride and extracted with ether. The extract was then dried over anhydrous sodium carbonate. The desired product (1.3 g) was obtained on evaporation of ether.

EXAMPLE 20

Synthesis of p-nitrophenyl Carbamate of Hydroxyhexyl Ketal of Example 19

Freshly purified p-nitrophenyl isocyanate (3.92 g, 0.02 mole) was dissolved in ether. To this was added 3(6-hydroxyhexyl)-2,2-dimethyl-1,3-dioxolane (3.24 g, 0.02 mole) and dibutyltin dilaurate (0.05 g) in ether (120 ml). The reaction temperature was kept at 30–40 for about 2 hrs before the yellow solid was filtered. The solid was recrystallized from ethanol to give bright light-yellow crystals in greater than 95% yield.

EXAMPLE 21

Synthesis of 8-p-nitrophenyl carbamate of 1,2,8-octanetriol (VI)

Deketalization may be performed as shown in Examples 10–18, or in the following manner:

A sulfonic acid ion exchange resin, Amberlyst-15 TM, (Aldrich Chemical Co., Milwaukee, Wis.) successively swollen in methylene chloride, ether and methanol over a period of 48 hrs, was added to a methanolic solution (150 ml) of the ketal (20 g). This was allowed to stir at room temperature for 24 hrs after which the Amberlyst-15 was removed by filtration and the filtrate evaporated. The solid obtained was recrystallized from ethanol to yield the desired product.

EXAMPLE 22-25

Examples 22–25 describe the synthesis of polyurethanes from carbamate diols.

Carbamate diols were polymerized with appropriate diisocyanates by mixing the two components in equivalent amounts in an inert, dry organic solvent like acetone, ethyl acetate (EtOAc), or N,N-dimethylformamide (DMF) in the presence of a catalyst, namely, DBTDL. Polyurethanes were isolated by precipitating the mixture into water (Example 22) or diethyl ether (Examples 23–25), washing with the precipitating liquid and drying under a vacuum. Results are summarized in Table 4 below.

TABLE 4

| Example* | Carbamate diol | Diisocyanate | Solvent | Time (hrs) |
| --- | --- | --- | --- | --- |
| 22 | A | C | acetone | 42* |
| 23 | B | D | EtOAc + DMF | 72 |
| 24 | B | E** | EtOAc + DMF | 72 |
| 25 | B | C | EtOAc + DMF | 72 |

*Structures and names for compounds A, B, C, D, and E are given below. All temperatures were at reflux temperature unless indicated otherwise.
**50/50 by volume isomeric mixture was used.

| Compound | Name | Structure |
| --- | --- | --- |
| A | 1,2-dihydroxy-3-propyl-o-tolyl carbamate | (o-tolyl)NHCO$_2$CH$_2$CH(OH)CH$_2$OH |

TABLE 4-continued

| | | |
|---|---|---|
| B | 1,2-dihydroxy-3-propyl-p-nitrophenyl carbamate | $O_2N$—C$_6$H$_4$—NHCO$_2$CH$_2$CH(OH)CH$_2$OH |
| C | 2,4-toluene-diisocyanate | (2,4-toluene diisocyanate structure) |
| D | isophorone-diisocyanate | (isophorone diisocyanate structure) |
| E | 2,2,4- and 2,4,4-trimethyl-hexamethylene diiisocyanate | $OCN-C_6H_9(CH_3)_3-NCO$ |

The data of TABLE 4 show the preparative conditions for polyurethanes from carbamate diols of Formula I and diisocyanates.

EXAMPLE 26

Synthesis of Polyester from Carbamate Diol of Example 17 with Adipoyl Chloride

A solution was made of 225 parts of carbamate diol (Example 17), 199 parts of adipoyl chloride (Aldrich Chemical Co., Milwaukee, Wis.) and 1000 parts of pyridine, and the mixture was heated on a steam bath for 30 mins. The resultant viscous solution was poured into water to give a gummy polymer which was isolated by decantation, washed with more water and dried under a vacuum to give a brittle solid polyester.

EXAMPLE 27

Synthesis of 4(2-hydroxyethoxymethyl)-2,2-dimethyl-1,3-dioxolane and 4(2-hydroxyethoxyethoxymethyl)-2,2-dimethyl-1,3-dioxolane In a 1 liter flask filled with a dry ice/ethanol cooled consenser was added potassium hydroxide (3 g) and 2,2-dimethyl-1,3-dioxolane-4-methanol (Aldrich, 650 mL). This mixture was stirred at 75° C. to effect dissolution of the potassium hydroxide. Ethylene oxide (Aldrich, 100 g) was then distilled slowly in the solution over 14 hrs. after which the reacting solution was kept at 75-80° C. for an additional 3 hrs before it was fractionally distilled under reduced pressure. The respective products and amounts (%) obtained were:

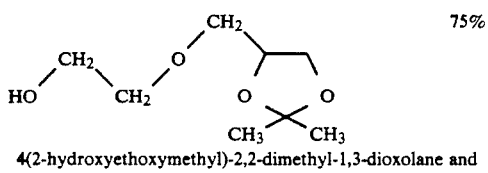

4(2-hydroxyethoxymethyl)-2,2-dimethyl-1,3-dioxolane and 75%

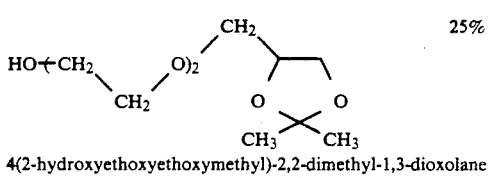

4(2-hydroxyethoxyethoxymethyl)-2,2-dimethyl-1,3-dioxolane 25%

These products were confirmed by NMR spectroscopy.

EXAMPLE 28

Preparation of Article Comprising a Layered Structure

The polymer of Example 24 was dissolved in N,N-dimethylacetamide and a few drops of acetone was added to facilitate overall solvent evaporation. The solution was spread on a glass slide using a knife edge and the solvent was allowed to slowly evaporate. This resulted in an optically clear film. Polymers originally provided on a substrate can be removed therefrom to provide a self-supporting film.

Various modifications and alterations of this invention will become apparent to those skilled in the art without departing from the scope and spirit of this invention, and it should be understood that this invention is not to be unduly limited to the following illustrative embodiments set forth herein.

We claim:

1. An article comprising a substrate having coated on at least one surface thereof a layer of a polymer having the structure

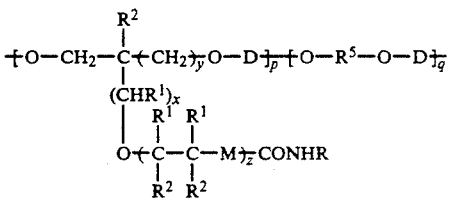

wherein

R is an alkyl, alkenyl, or aryl group having 1 to 20 carbon atoms;

$R^1$ and $R^2$ can be the same or different and each is selected from hydrogen and alkyl, alkenyl, alkoxyalkyl, aryl, aryloxyalkyl, alkoxyaryl, aralkyl or alkaryl groups, wherein $R^1$ and $R^2$ together total from zero to forty carbon atoms, or a pair of $R^1$ and $R^2$ together with the carbon atoms to which they are joined can form an aliphatic cyclic structure of 5 to 7 atoms;

D can be

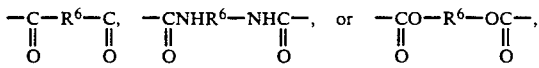

R⁵ and R⁶ can be the same or different, and each is a divalent organic group selected from (1) aliphatic groups having 1 to 20 carbon atoms, (2) cycloaliphatic groups having 5 to 12 carbon atoms, and (3) arylene groups having 6 to 12 carbon atoms;

M is a unitary heteroatom selected from —O— and —S—;

p is an integer having a value from 1 to 10,000;

q is an integer which can be zero or greater than zero such that when q is not zero, then the ratio of q to p can be in the range of 1:10,000 to 10,000:1;

x is an integer from 0 to 20;

y can be zero or 1 provided that at least one of x and y is not zero;

z is an integer from 0 to 20;

and wherein said polymer is uncrosslinked; wherein said substrate is transparent to actinic radiation in the wavelength range of 0.3 to 20 micrometers.

2. The article according to claim 1 wherein R of said polymer is substituted by a non-proton-donating group.

3. The article of claim 1 wherein at least one of said aliphatic groups R⁵ and R⁶ of said polymer comprises up to 19 unitary catenary atoms or groups selected from —O—, —S—, and —NR⁷—, where R⁷ is a lower alkyl group having one to four carbon atoms.

4. The article of claim 1 wherein at least one of said cycloaliphatic groups R⁵ and R⁶ of said polymer further comprise one ring —O—, —S—, or NR⁷— atom or group therein where R⁷ is a lower alkyl group having one to four carbon atoms.

5. The article of claim 1 wherein R¹ and R² of said polymer are part of a cycloaliphatic structure, and wherein said cycloaliphatic structure includes one or two unitary ring atoms selected from oxygen, nitrogen, and sulfur.

6. The article of claim 1 wherein at least one of R, R¹, and R² of said polymer is substituted by a non-proton-donating atom or group selected from the group consisting of halogen, NO₂, CN, aldehyde group, acyl group having 1 to 10 carbon atoms, and an aroyl group having 6 to 10 carbon atoms.

7. The article according to claim 1 wherein said polymeric film has been removed from said substrate to provide a self-supporting film.

* * * * *

UNITED STATES PATENT AND TRADEMARK OFFICE
CERTIFICATE OF CORRECTION

PATENT NO. : 5,212,015
DATED : May 18, 1993
INVENTOR(S) : Smarajit Mitra et al.

It is certified that error appears in the above-identified patent and that said Letters Patent is hereby corrected as shown below:

Col. 1, line 62, after "same" insert -- method for making monocarbamate diols by the reaction of --.

Col. 9, line 20, "above A" should read -- above. A --.

Col. 9, line 42, "o, m-," should be -- o-, m- --.

Signed and Sealed this

Fifteenth Day of February, 1994

BRUCE LEHMAN

*Attest:*

*Attesting Officer*  *Commissioner of Patents and Trademarks*